(12) United States Patent
Lal et al.

(10) Patent No.: US 10,922,494 B2
(45) Date of Patent: Feb. 16, 2021

(54) ELECTRONIC COMMUNICATION SYSTEM WITH DRAFTING ASSISTANT AND METHOD OF USING SAME

(71) Applicant: Mitel Networks ULC, Vancouver (CA)

(72) Inventors: Sachin Kumar Lal, Bangalore (IN); Logendra Naidoo, Ottawa (CA)

(73) Assignee: Mitel Networks Corporation, Ottawa (CA)

(*) Notice: Subject to any disclaimer, the term of this patent is extended or adjusted under 35 U.S.C. 154(b) by 21 days.

(21) Appl. No.: 16/216,721

(22) Filed: Dec. 11, 2018

(65) Prior Publication Data

US 2020/0184018 A1    Jun. 11, 2020

(51) Int. Cl.
*G06F 40/30* (2020.01)
*H04L 12/58* (2006.01)

(52) U.S. Cl.
CPC .............. *G06F 40/30* (2020.01); *H04L 51/02* (2013.01); *H04L 51/04* (2013.01)

(58) Field of Classification Search
USPC .................................. 704/7, 10, 8; 715/271
See application file for complete search history.

(56) References Cited

U.S. PATENT DOCUMENTS

| | | | | |
|---|---|---|---|---|
| 7,487,216 B2* | 2/2009 | Miller | ...................... | G06F 9/451 709/206 |
| 7,921,176 B2 | 4/2011 | Madnani | | |
| 7,925,496 B1* | 4/2011 | Rubin | ................... | G06F 16/345 704/7 |
| 8,605,879 B2* | 12/2013 | Wellard | ................ | H04M 3/436 379/201.01 |
| 8,875,029 B1* | 10/2014 | Naidu | ..................... | G06Q 10/10 715/752 |
| 10,158,593 B2* | 12/2018 | Pfriem | ..................... | H04L 51/04 |
| 10,509,860 B2* | 12/2019 | Zhang | ................... | G06F 40/205 |
| 10,594,757 B1* | 3/2020 | Shevchenko | ......... | G06F 40/253 |
| 2008/0253557 A1* | 10/2008 | Dottax | .................. | H04L 9/0631 380/28 |
| 2013/0326323 A1* | 12/2013 | Siwoff | ................... | G06F 40/169 715/229 |
| 2013/0346065 A1* | 12/2013 | Davidson | .............. | G06F 40/263 704/8 |
| 2014/0172417 A1* | 6/2014 | Monk, II | ................ | G06F 40/30 704/9 |
| 2014/0237406 A1* | 8/2014 | Lee | ......................... | G06F 3/017 715/766 |
| 2016/0080303 A1 | 3/2016 | Deolalikar et al. | | |
| 2016/0142344 A1* | 5/2016 | Mandhani | .......... | G06F 16/3329 709/206 |
| 2016/0219078 A1* | 7/2016 | Porras | .................... | G06F 3/0484 |
| 2016/0259769 A1* | 9/2016 | Siwoff | ................... | G06F 40/137 |
| 2016/0330144 A1* | 11/2016 | Dymetman | .............. | G06F 40/20 |
| 2016/0342665 A1* | 11/2016 | Lane | ...................... | H04L 51/046 |
| 2017/0012927 A1* | 1/2017 | Wollan Fan | ............ | H04L 51/32 |
| 2017/0060509 A1* | 3/2017 | Tulasi | ........................ | G06F 3/14 |

(Continued)

*Primary Examiner* — Thai Q Phan

(57) ABSTRACT

A method and system for assisting a user in preparing a response to an electronic communication, such as an email, are disclosed. The system includes a context analyzer, a context repository, a sentential template repository, and an auto-draft builder. The auto-draft builder uses information from the sentential template repository and context repository to prepare a proposed response to the electronic communication.

20 Claims, 14 Drawing Sheets

(56) References Cited

U.S. PATENT DOCUMENTS

| | | |
|---|---|---|
| 2017/0118348 A1* | 4/2017 | Dotan-Cohen ... H04M 3/42365 |
| 2017/0124038 A1 | 5/2017 | Upadhyay et al. |
| 2017/0228361 A1* | 8/2017 | Zhang ................... G06F 16/337 |
| 2018/0006989 A1* | 1/2018 | Dotan-Cohen ......... H04L 51/04 |
| 2018/0077088 A1 | 3/2018 | Cabrera-Cordon et al. |
| 2018/0212918 A1* | 7/2018 | Stolorz ................... H04N 21/25 |
| 2019/0079912 A1* | 3/2019 | Siwoff ................... G06F 40/169 |
| 2019/0081916 A1* | 3/2019 | Pfriem ................... H04L 51/04 |
| 2019/0281001 A1* | 9/2019 | Miller ..................... H04L 51/28 |
| 2019/0356750 A1* | 11/2019 | Dotan-Cohen ......... H04L 67/26 |

\* cited by examiner

EXAMPLE 1 – PICNIC INVITATION

From: Doris Day
To: John Appleseed, Sue Wang, Ali Max, Clara Black, Gaetan White
Subject: Charity Picnic Hi guys,
Who is in for the picnic? For a good cause! Hope to see you there, Saturday, July 13$^{th}$, 1pm, Larris Park.

Doris

---

From: John Appleseed
To: Doris Day
Cc: John Appleseed, Sue Wang, Ali Max, Clara Black, Gaetan White
Subject: Charity Picnic I'll be late, but I'll be there! I'll bring brownies for dessert.

John

---

From: Ali Max
To: Doris Day
Cc: John Appleseed, Sue Wang, Ali Max, Clara Black, Gaetan White
Subject: Charity Picnic I'm in, but I need a ride. I'll take care of the cheese. Clara, can you give me a ride?

Ali

---

From: Gaetan White
To: John Appleseed, Sue Wang, Ali Max, Clara Black, Gaetan White
Subject: Charity Picnic Sorry guys – I can't make it to the picnic.

Gaetan

---

From: Sue Wang
To: Doris Day
Cc: John Appleseed, Sue Wang, Ali Max, Clara Black, Gaetan White
Subject: Charity Picnic I would like to come. Where is Larris Park?

Sue

---

From: Ali Max
To: Doris Day
Cc: John Appleseed, Sue Wang, Ali Max, Clara Black, Gaetan White
Subject: Charity Picnic Larris Park is a few km away.
If Clara comes, she can.

Ali

FIG. 6

EXAMPLE 1 – PICNIC INVITATION

From: Doris Day
To: John Appleseed, Sue Wang, Ali Max, Clara Black, Gaetan White
Subject: Charity Picnic Hi guys,
Who is in for the picnic? For a good cause? Hope to see you there, Saturday, July 13th, 1pm, Larris Park.

Doris

[John 1] — 702

From: John Appleseed
To: Doris Day
Cc: John Appleseed, Sue Wang, Ali Max, Clara Black, Gaetan White
Subject: Charity Picnic I'll be late, but I'll be there! I'll bring brownies for dessert.

John

[Ali 1] — 704

From: Ali Max
To: Doris Day
Cc: John Appleseed, Sue Wang, Ali Max, Clara Black, Gaetan White
Subject: Charity Picnic I'm in, but I need a ride. I'll take care of the cheese. Clara, can you give me a ride?

Ali

ADDRESSES INVOLVEMENT

From: Gaetan White
To: John Appleseed, Sue Wang, Ali Max, Clara Black, Gaetan White
Subject: Charity Picnic Sorry guys – I can't make it to the picnic.

Gaetan   [Gaetan 1] — 706

From: Sue Wang
To: Doris Day
Cc: John Appleseed, Sue Wang, Ali Max, Clara Black, Gaetan White
Subject: Charity Picnic I would like to come. Where is Larris Park?

Sue   [Sue 1] — 708

From: Ali Max
To: Doris Day
Cc: John Appleseed, Sue Wang, Ali Max, Clara Black, Gaetan White
Subject: Charity Picnic Larris Park is a few km away.
If Clara comes, she can.

Ali   [Ali 2] — 710

FIG. 7

EXAMPLE 1 – PICNIC INVITATION

From: Doris Day
To: John Appleseed, Sue Wang, Ali Max, Clara Black, Gaetan White
Subject: Charity Picnic Hi guys,
Who is in for the picnic? For a good cause? Hope to see you there, Saturday, July 13th, 1pm, Larris Park.

Date 804

Time 802

Location 806

From: John Appleseed
To: Doris Day
Cc: John Appleseed, Sue Wang, Ali Max, Clara Black, Gaetan White
Subject: Charity Picnic I'll be late, but I'll be there! I'll bring brownies for dessert.

John

From: Ali Max
To: Doris Day
Cc: John Appleseed, Sue Wang, Ali Max, Clara Black, Gaetan White
Subject: Charity Picnic I'm in, but I need a ride. I'll take care of the cheese. Clara, can you give me a ride?

Ali

NAMED ENTITY RECOGNITION

From: Gaetan White
To: John Appleseed, Sue Wang, Ali Max, Clara Black, Gaetan White
Subject: Charity Picnic Sorry guys – I can't make it to the picnic.

Gaetan

From: Sue Wang
To: Doris Day
Cc: John Appleseed, Sue Wang, Ali Max, Clara Black, Gaetan White
Subject: Charity Picnic I would like to come. Where is Larris Park?

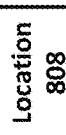

Location 808

Sue

From: Ali Max
To: Doris Day
Cc: John Appleseed, Sue Wang, Ali Max, Clara Black, Gaetan White
Subject: Charity Picnic

Larris Park is a few km away.
If Clara comes, she can

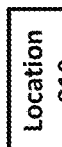

Location 810

Ali

FIG. 8

EXAMPLE 1 – PICNIC INVITATION

From: Doris Day
To: John Appleseed, Sue Wang, Ali Max, Clara Black, Gaetan White
Subject: Charity Picnic Hi guys,
Who is in for the picnic? For a good cause? Hope to see you there, Saturday, July 13<sup>th</sup>, 1pm, Larris Park.

Doris

⎡ Topic1 - *Food* ⎤ — 902

From: John Appleseed
To: Doris Day
Cc: John Appleseed, Sue Wang, Ali Max, Clara Black, Gaetan White
Subject: Charity Picnic I'll be late, but I'll be there! I'll bring *brownies* for *dessert*.

John

From: Ali Max
To: Doris Day
Cc: John Appleseed, Sue Wang, Ali Max, Clara Black, Gaetan White
Subject: Charity Picnic I'm in, but I need a ride. I'll take care of the *cheese*. Clara, can you give me a ride?

Ali

KEYWORD / TOPIC

From: Gaetan White
To: John Appleseed, Sue Wang, Ali Max, Clara Black, Gaetan White
Subject: Charity Picnic Sorry guys -- I can't make it to the picnic.

Gaetan

From: Sue Wang
To: Doris Day
Cc: John Appleseed, Sue Wang, Ali Max, Clara Black, Gaetan White
Subject: Charity Picnic I would like to come. Where is Larris Park?

Sue

⎡ Topic2 - Travel ⎤ — 904

From: Ali Max
To: Doris Day
Cc: John Appleseed, Sue Wang, Ali Max, Clara Black, Gaetan White
Subject: Charity Picnic Larris Park is a few km away. If Clara comes, she can.

Ali

FIG. 9

EXAMPLE 1 – PICNIC INVITATION

From: Doris Day
To: John Appleseed, Sue Wang, Ali Max, Clara Black, Gaetan White
Subject: Charity Picnic

Hi guys,
Who is in for the picnic? For a good cause? Hope to see you there. Saturday, July 13th, 1pm, Larris Park.

Doris

> EVENT: PICNIC 1002

---

From: John Appleseed
To: Doris Day
Cc: John Appleseed, Sue Wang, Ali Max, Clara Black, Gaetan White
Subject: Charity Picnic I'll be late, but I'll be there! I'll bring brownies for dessert.

John

---

From: Ali Max
To: Doris Day
Cc: John Appleseed, Sue Wang, Ali Max, Clara Black, Gaetan White
Subject: Charity Picnic I'm in, but I need a ride. I'll take care of the cheese. Clara, can you give me a ride?

Ali

EVENT DETECTION

From: Gaetan White
To: John Appleseed, Sue Wang, Ali Max, Clara Black, Gaetan White
Subject: Charity Picnic Sorry guys – I can't make it to the picnic.

Gaetan

---

From: Sue Wang
To: Doris Day
Cc: John Appleseed, Sue Wang, Ali Max, Clara Black, Gaetan White
Subject: Charity Picnic I would like to come. Where is Larris Park?

Sue

---

From: Ali Max
To: Doris Day
Cc: John Appleseed, Sue Wang, Ali Max, Clara Black, Gaetan White
Subject: Charity Picnic Larris Park is a few km away. If Clara comes, she can.

Ali

FIG. 10

EXAMPLE 1 – PICNIC INVITATION

From: Doris Day
To: John Appleseed, Sue Wang, Ali Max, Clara Black, Gaetan White
Subject: Charity Picnic Hi guys,
Who is in for the picnic? For a good cause? Hope to see you there, Saturday, July 13th, 1pm, Larris Park.

Doris

---

From: John Appleseed
To: Doris Day
Cc: John Appleseed, Sue Wang, Ali Max, Clara Black, Gaetan White
Subject: Charity Picnic I'll be late, but I'll be there! I'll bring brownies for dessert.

John

---

From: Ali Max
To: Doris Day
Cc: John Appleseed, Sue Wang, Ali Max, Clara Black, Gaetan White
Subject: Charity Picnic I'm in, but I need a ride. I'll take care of the cheese. Clara, can you give me a ride? — 1102

Ali

USER TARGET SENTENCES

From: Gaetan White
To: John Appleseed, Sue Wang, Ali Max, Clara Black, Gaetan White
Subject: Charity Picnic Sorry guys – I can't make it to the picnic.

Gaetan

---

From: Sue Wang
To: Doris Day
Cc: John Appleseed, Sue Wang, Ali Max, Clara Black, Gaetan White
Subject: Charity Picnic I would like to come. Where is Larris Park?

Sue

---

From: Ali Max
To: Doris Day
Cc: John Appleseed, Sue Wang, Ali Max, Clara Black, Gaetan White
Subject: Charity Picnic Larris Park is a few km away.
If Clara comes, she can. — 1104

Ali

FIG. 11

Sentential Template Repository (210)

| | Template | Required Info from Context Repository* | Probability (based on user's selection) |
|---|---|---|---|
| 1302 | Yes, I'll be at the EVENT, on DATE. | EVENT, DATE | 0.1 |
| 1304 | Sorry, I cannot make it to the EVENT, on DATE. | EVENT, DATE | 0.6 |
| 1306 | For EVENT, I am not available on DATE, but can we move it to …. | EVENT, DATE | 0.3 |
| 1308 | About TOPIC, I think that … | TOPIC | 0.9 |
| 1310 | I was away during EVENT, sorry I missed it. | EVENT | 0.5 |
| 1312 | Seems like P1, and P2, are quite interested in this TOPIC. | Addresses summary (P1, P2) TOPIC | 0.3 |
| 1314 | P1, about your specific question S1, yes I could … | User-addressed sentence S1 / from P1 | 0.3 |
| 1316 | P1, about your specific question S1, I'm sorry I cannot … | User-addressed sentence S1 / from P1 | 0.5 |

FIG. 13

Sentential Template Repository (210)

| | Template | Required Info from Context Repository* | Probability |
|---|---|---|---|
| 1302 | Yes, I'll be at the EVENT, on DATE. | EVENT, DATE | 0.1 |
| 1304 | Sorry, I cannot make it to the EVENT, on DATE. | EVENT, DATE | 0.6 |
| 1306 | For EVENT, I am not available on DATE, but can we move it to … | EVENT, DATE | 0.3 |
| 1308 | About TOPIC, I think that … | TOPIC | 0.9 |
| 1310 | I was away during EVENT, sorry I missed it. | EVENT | 0.5 |
| 1312 | Seems like P1, and P2, are quite interested in this TOPIC. | Addresses summary (P1, P2) TOPIC | 0.3 |
| 1314 | P1, about your specific question S1, yes I could … | User-addressed sentence S1 / from P1 | 0.3 |
| 1316 | P1, about your specific question S1, I'm sorry I cannot … | User-addressed sentence S1 / from P1 | 0.5 |

| | Template | Probability or Weighting | | Select? | |
|---|---|---|---|---|---|
| 1402 | Sorry, I cannot make it to the picnic on Saturday July 13th. | 0.6 | 1412 | YES/NO | 1422 |
| 1404 | Yes, I'll be at the picnic on Saturday July 13th. | 0.1 | 1414 | YES/NO | 1424 |
| 1406 | For the picnic, I am not available on Saturday July 13th, but can we move it to … | 0.3 | 1416 | YES/NO | 1426 |
| 1408 | Ali, about your specific question, "Ciara, can you give me a ride?", yes I could … | 0.3 | 1418 | YES/NO | 1428 |
| 1410 | Ali, about your specific question, "Ciara, can you give me a ride?", I'm sorry I cannot … | 0.5 | 1420 | YES/NO | 1430 |

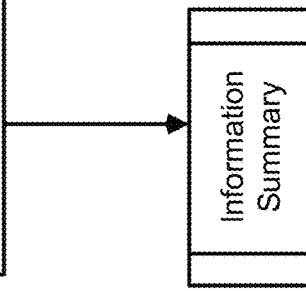

Information Summary

FIG. 14

ELECTRONIC COMMUNICATION SYSTEM WITH DRAFTING ASSISTANT AND METHOD OF USING SAME

FIELD OF THE INVENTION

The present disclosure generally relates to electronic communication methods and systems. More particularly, the disclosure relates to electronic communication methods and systems that use a drafting assistant to facilitate preparation of a written response to an electronic communication.

BACKGROUND OF THE DISCLOSURE

Electronic communications, such as email, text messaging, chat, social media, and the like continue to become ever more prevalent with the advent of increasingly capable communication devices and systems. The electronic communications are a way for two or more people to converse regarding particular topics and/or particular contexts.

Often, when an electronic communication is sent, it is desired to receive a written electronic communication in return. It may further be desired to receive the written electronic communication within a relatively short period of time after the electronic communication is sent or is received by a recipient. For example, parties to an electronic communication conversation may be waiting for a recipient to respond via a written electronic communication before an action is taken or before the conversation continues. However, for a variety of reasons, it may be difficult for the recipient to timely respond in written form. For example, the recipient may receive the message on a mobile device, and it may be cumbersome and/or time consuming for the recipient to use the mobile device to type an appropriate response. Accordingly, improved methods and systems that facilitate preparing written responses to electronic communications are desired.

Additionally, when a thread of electronic communications becomes relatively long, it may be difficult to remember the context(s) of the thread and therefore recipients on a relatively long thread may respond off context—e.g., off topic. Accordingly, improved methods and systems that facilitate staying on context or topic when preparing written responses to electronic communications are additionally and/or alternatively desired. Further, it may be desirable to facilitate a recipient/user determining a context of a conversation—whether a response is prepared—or not.

Any discussion of problems provided in this section has been included in this disclosure solely for the purposes of providing a background for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIGS. 6-11 illustrate identification of keywords in a communication thread in accordance with exemplary embodiments of the disclosure.

FIG. 13 illustrates exemplary sentential templates in accordance with examples of the disclosure.

FIG. 14 illustrates proposed responses in accordance with illustrative examples of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems that include a drafting assistant to facilitate preparation of a written response to an electronic communication and to methods of preparing written responses to an electronic communication using the drafting assistant. While the ways in which the present disclosure addresses various drawbacks of prior systems and methods are described in more detail below, in general, various systems and methods described herein use a drafting assistant that receives information retrieved by a context analyzer to automatically prepare proposed responses to an electronic communication, such as an email, a text message, a chat message, a social media message, a transcribed message, or the like.

Figure 1:
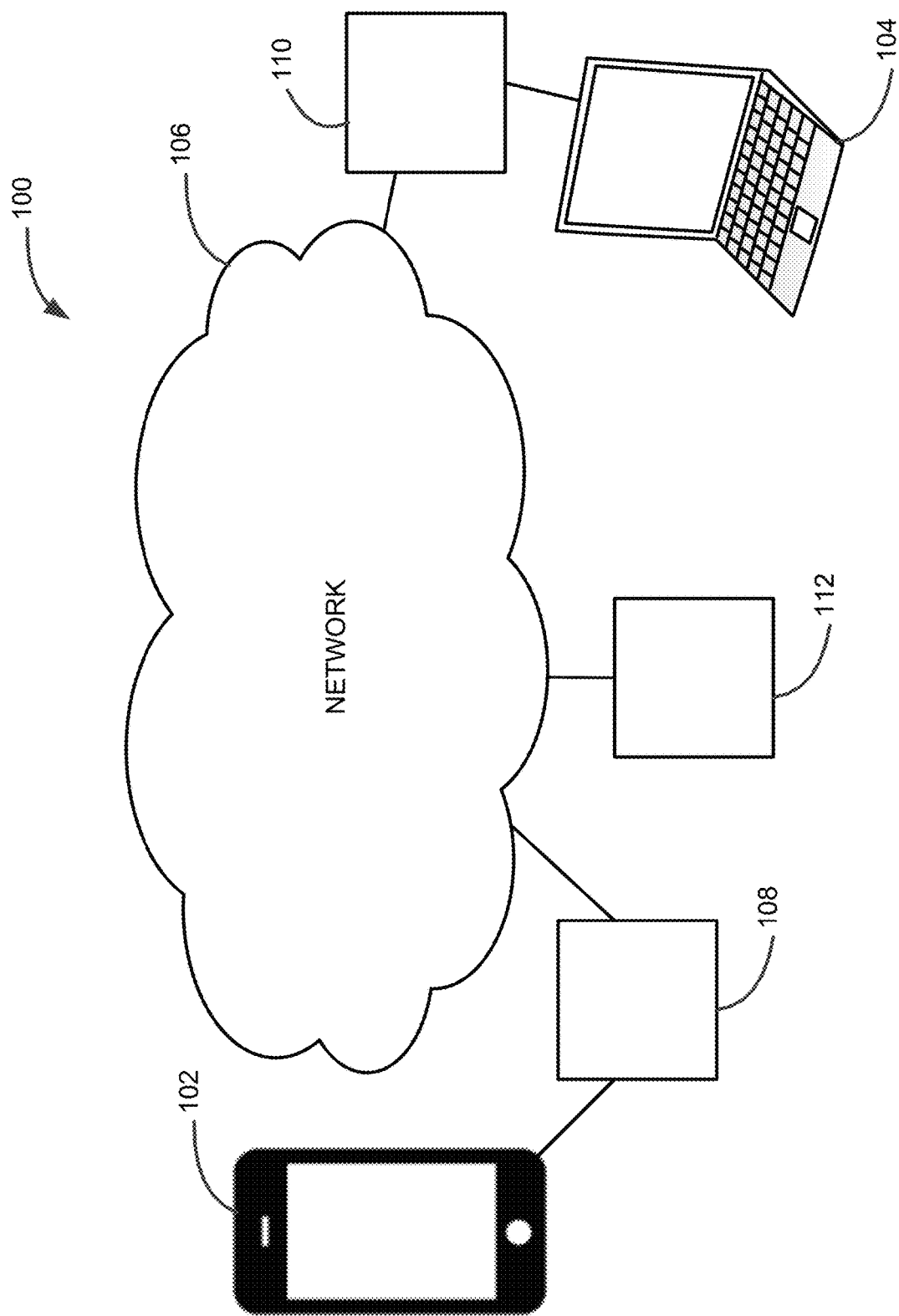
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. For illustration purposes, system 100 is described in the context of an email communication system and method. However, unless otherwise noted, systems and methods in accordance with embodiments of the disclosure are not so limited.

Electronic communication system 100 includes a first device 102 and a second device 104 coupled to a network 106 and an auto draft assistant system 112. First device 102 and second device 104 can be used to send electronic communications to each other and/or to other devices connected to network 106. In the illustrated example, system 100 also includes communication servers 108, 110, which can be or include email servers, text servers, or the like.

Devices 102, 104 can be or include any suitable device with wired or wireless communication features that can connect to network 106. For example, devices 102, 104 can include a wearable device, a tablet computer, a wired phone, a mobile phone, a personal (e.g., laptop or desktop) computer, a streaming device, such as a game console or other media streaming device, or the like. One or more of devices 102, 104 can include an application or client to perform various functions set forth herein and/or to cause to be displayed text and/or other information as described herein. For example, a device 102, 104 can include an application or a client to perform or cause to be performed the search engine functions described herein.

Network 106 can include or be, for example, an internet protocol (IP) network. Exemplary types of networks suitable for communication network 106 include a local area network, a wide-area network, a metropolitan area network, wireless networks, or the Internet. Various components of network 106 can be coupled to one or more other components using an Ethernet connection, other wired connections, and/or wireless interfaces. Network 106 can be coupled to other networks and/or to other devices typically coupled to networks. By way of particular example, network 106 includes a communication network and network 106 can be coupled to additional networks (not illustrated) that can be coupled to one or more of devices 102, 104.

Communication servers 108, 110 can include email servers (incoming and/or outgoing email servers) and, optionally, a domain name server (DNS). Although separately illustrated, communication servers 108, 110 can form part of network 106 or another network.

Auto draft assistant system 112 is used by a recipient of an electronic communication (e.g., a user of device 102 or 104) to prepare one or more proposed written responses to an electronic communication received on device 102, 104. Although separately illustrated, unless otherwise noted herein, all or part of auto draft assistant system 112 can form part of network 106, another network, and/or part of one or more devices 102, 104.

Figure 2:
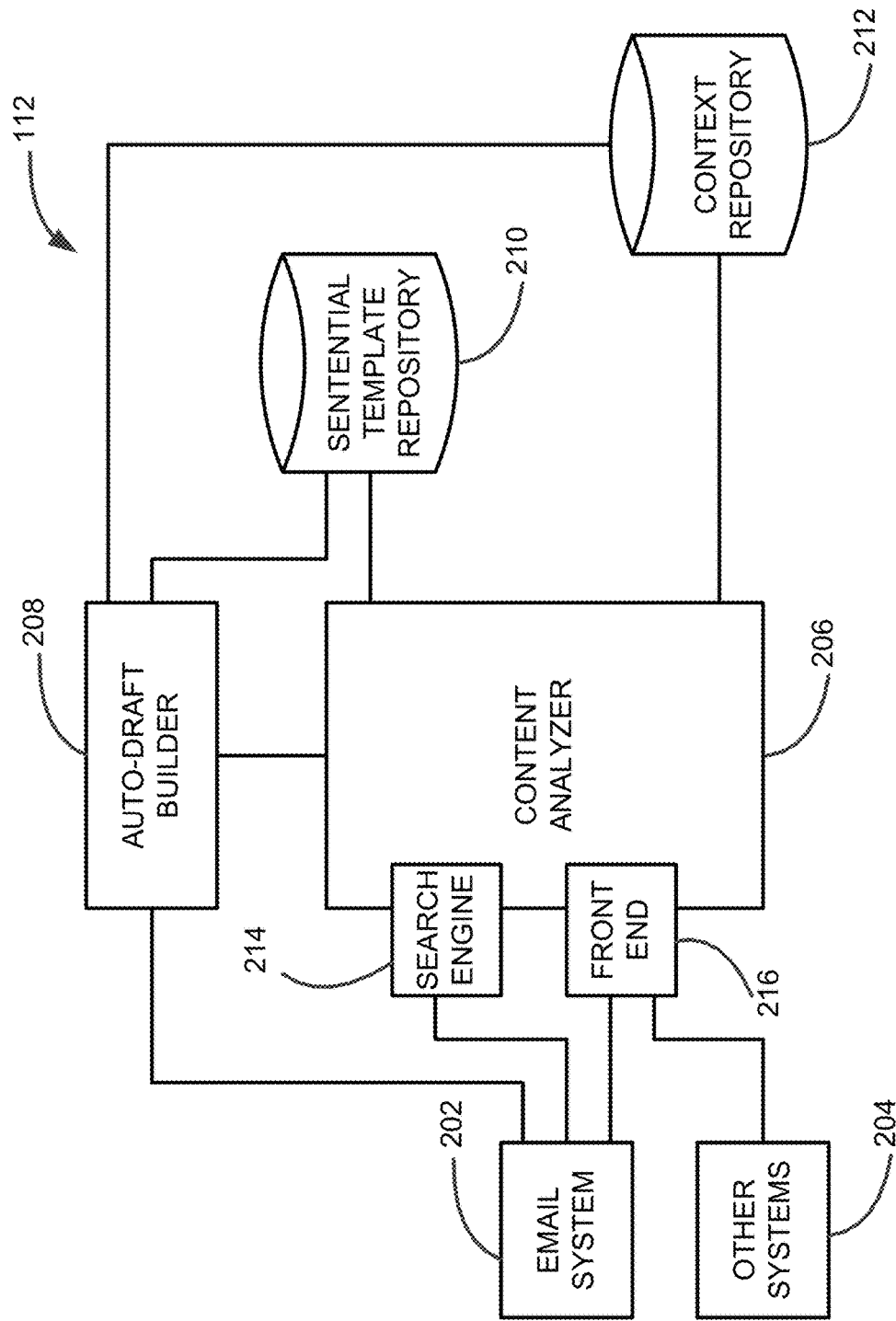
FIG. 2 illustrates a portion of an electronic communication system in accordance with exemplary embodiments of the disclosure in greater detail.

FIG. 2 illustrates exemplary components of auto draft assistant system 112 in accordance with various embodiments of the disclosure. Auto draft assistant system 112 includes email system components 202, optionally other system(s) components 204, a context analyzer 206, an auto-draft builder 208, a sentential template repository 210, and a context repository 212. Context analyzer 206, auto-draft builder 208, sentential template repository 210, and context repository 212 can each be in the form of a module or two of more of context analyzer 206, auto-draft builder 208, sentential template repository 210, and context repository 212 can be in the form of a module. As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

In the illustrated example, auto draft assistant system 112 can determine and/or be used to determine one or more contexts within an email thread, facilitate or propose responses to an email, and/or help a user stay within context or topic (e.g., the latest or most relevant topic) when replying to an email. As set forth in more detail below, the system can automatically update and acquire information from multiple sources to determine context(s) of an email thread and to propose one or more text(s) or other information for a user to select as a response or to further edit before sending as a response. Additionally, in accordance with some exemplary embodiments, a user can use auto draft assistant system 112 to query a thread for specific information or to determine one or more contexts within the thread. Auto draft assistant system 112 can also alert a user when a selected, edited, or newly drafted response may veer off context or topic. In accordance with at least some embodiments of the disclosure, auto draft assistant system 112 acquires context information from chat, text, and/or social media resources in addition to or in lieu of acquiring such information from the email thread.

As set forth in more detail below, auto draft assistant system 112 can use sentential templates and proposed keywords and/or contexts derived from various sources to prepare responses to electronic communications in sentence form. Auto draft assistant system 112 system can display indicia of strength (e.g., weightage or relevance percentage) for proposed keywords, contexts, and/or sentences, and allow a user to select a desired proposed response and/or proposed keywords for a particular proposed response (sometimes referred to herein simply as a response). Additionally or alternatively, a user can add a user confidence level for a response and/or modify an existing or proposed confidence level. This information can be stored and updated in context repository 212.

Email system components 202 can include, for example, one or more servers (e.g., incoming, outgoing, and/or storage servers), various network components (e.g., routers), domain name systems, and the like. In accordance with at least one embodiment of the disclosure, email system components 202 include a server (e.g., server 108) in which email messages associated with each user are stored and/or transmitted from. These emails can be reviewed to determine context(s) of a particular email thread. For example, an email thread on the server or received from the server can be analyzed and/or other emails on the server or received from the server can be analyzed to determine context(s) of a particular email thread.

Other system components 204 can similarly include components of other electronic communication systems. For example, other system components 204 can include one or more servers or other databases on which information, such as text messages, social media postings, chat messages, documents, other emails (e.g., on other systems), and the like can be stored. Information stored on or received from other system components 204 can be used to determine context(s) of a particular email thread sent, received, and/or stored using email system components 202.

Context analyzer 206 is used to determine and analyze context(s) of a particular email thread (e.g., an email thread displayed/opened on a user device, such as device 102 or 104) stored on and/or received from email system components 202 and/or other system(s) components 204. To determine the context(s) within the email thread, context analyzer 206 can determine and analyze keywords, such as words, phrases, clauses, and/or topics within an email thread or other information (e.g., from other system(s) components 204 or other email threads) that can be used to identify a context. Context analyzer 206 is also configured to store or to cause to be stored associated information, such as the keywords, proposed keywords, context, and/or cues in context repository 212. Context analyzer 206 can cause context repository 212 to be created upon receiving, notification of drafting, or notification of sending the initial email. Or, an email thread can include a minimal or predetermined number of emails—e.g., 5, 10, 15, or the like, before context analyzer 206 causes context repository 212 to be formed. A new context repository 212 can be created for each email thread or for each thread having a predetermined length or number of emails.

As used herein, "context" and/or "context information" can be or include keywords as described herein. Additionally or alternatively, "context" and/or "context information" can include information derived from keywords. For example, keywords can be or comprise objects and/or actions as set forth in U.S. Publication No. 2012/0179706 A1, the contents of which are incorporated herein by reference, to the extent such contents do not conflict with the present disclosure. Context information derived from keywords can include, for example, categories for the keywords. For example, a keyword can include a particular weekday, and the context could include time or day. Or, a keyword may be specific to a particular object (direct or indirect) within a noun clause, such as "Just a reminder honey. Book the dog sitter!" in which case the relevant keywords are broken in the constituent elements: User performs an action such as "book" regarding a person or thing toward which the action of a verb is directed, for example, "the dog sitter." Additional context may be derived from other sentences within the thread and optionally from other resources, such as those described herein. By way of example, additional context can be derived from other communications (e.g., another email thread or the like) having a shared context and/or shared keywords.

A context can be determined based on, for example, the most statistically relevant keywords as determined by the context analyzer. The most statistically relevant keywords can be determined based on, for example, the time at which a keyword derived is received in an email thread. Earlier keywords can be weighted differently, that is less relevant, than keywords that are more recently received in a strings of messages, such as an email thread; frequency of occurrence of the words, for example, in a message the repeated use of words such as "customer x needs to perform a software upgrade", where the word "upgrade" is used several times across multiple emails (e.g., by multiple interlocutors) results in a greater weighting of that keyword for the purposes of an assisted drafting process; and context, for example where previous keywords were used in an automatic response and categorized under a previous keyword (e.g., topic). The use of context to increase the statistical significance of a keyword is based on the premise that previously derived keywords are of greater relevance when drafting a response.

Additionally, the auto-draft process can be adjustable, where a user has the option to adjust confidence levels and/or insert a user confidence level associated with one or more proposed responses or one or more proposed keywords to be inserted into a proposed response, depend on the auto draft assistant system 112 to prepare the response (e.g., when the keywords and/or proposed responses have the highest weighting), or depend on a user to select from the proposed responses and/or keywords or to insert additional information when the weighting is less than the highest or a predetermined level. Additionally, or alternatively, a user can manually search context-repository 212 with challenge queries to check the relevant keywords (e.g., topics)/contexts—e.g., auto draft assistant system 112 can include a search window into context repository 212.

Context analyzer 206 also forms and updates context repository 212 by adding context information to the database. In accordance with some embodiments of the disclosure, each time a user writes a new email or receives a new email (or after a predetermined number or length of email is written and/or received), a context repository 212 is created, and context repository 212 is updated with each subsequent email received by or sent from that user. This means that the repository is constantly updated with information (e.g., keywords) from newer conversations, thereby improving the accuracy of proposed responses. Context analyzer 206 can also determine and cause to be stored in context repository 212 and/or sentential template repository 210 and/or elsewhere, responses from users to a particular context (e.g., "let's meet on Wednesday" with a follow-up response "yup;" "yes;" "sounds good;" "thumbs up," etc.).

As noted above, context analyzer 206 can also mine other databases, such as databases that form part of one or more other systems(s) components 204, for keywords, contexts, and possible responses, and cause context repository 212 to store such information globally and/or associated with a particular email thread.

In accordance with at least one embodiment of the disclosure, context analyzer 206 or auto draft assistant system 112 assigns a weight to one or more keywords and/or contexts in context repository 212. These weights can be displayed to a user as an indicia of strength when proposed responses are presented to the user. The weights can be based on, for example, time (e.g., whether the keyword(s) was/were used in the latest email (the more recent the email, the higher the weighting for the keyword), a number of times the keyword(s) appear(s) in the thread, and/or whether and when the keyword(s) appear(s) in other system(s) components 204).

An exemplary method for determining keywords using context analyzer 206 is active in the public domain, relying on an open source based topic identification process. By way of example, a method for determining proposed keywords can employ use of the Stanford Core NLP (Natural Language Processing) version 3.9.2, which is an open source facility designed to apply linguistic principles to passages of text, with the goal of parsing the text into meaningful words; the contents of which are hereby incorporated herein by reference to the extent such contents do not conflict with the present disclosure. Such classification of text is accomplished through statistical models that include natural language processing techniques and can further include a database of words for reconciliation. Once the analytical tool is applied to text, statistical variations for various keywords can be used to develop a better understanding of the potential meanings or contexts. Keyword identification can be based on the statistical processing technique, where within a passage of text, such as an email thread, certain words appear more often. The premise is that for example the word "wheat" and "growing" appear statistically more than any other word combinations, the context may be derived as "growing wheat." Other words can also contribute to the context and more accurately be used in an automatic response.

Auto-draft builder 208 receives context information from context repository 212 and from sentential template repository 210 to prepare one or more proposed responses comprising text and/or other information (e.g., images, audio information, or the like) to present to a user, wherein a user can then modify, accept, decline, modify a weighting, and/or add a user confidence level to one or more of the proposed responses.

Proposed responses that are created by auto-draft builder can include proposed keywords (e.g., the highest weighted keywords) or leave the selection of keywords or other words for a user to enter or select. For example, auto-draft builder 208 can cause to be displayed template sentence(s) having blanks or proposed keywords within the proposed sentence(s). A user can select from one or more proposed sentences and/or one or more proposed keywords for each proposed sentence. A weighting for each sentence and/or for each proposed keyword can be displayed to a user to facilitate a user making a decision as to which proposed keywords to select. The selected information is then stored in context repository 212, the sentential template repository and/or elsewhere and can be used for formation of subsequent responses. Proposed keywords can be or include keywords as determined by context analyzer 206 and as stored in context repository 212. Additionally or alternatively, proposed keywords can be or include other context information stored in context repository 212 and associated with a context.

Below is an exemplary proposed response generated by auto-draft builder in response to an email received. The exemplary response includes multiple sentences that can be selected or declined by a user, with proposed keywords highlighted (underlined in the illustrated example), wherein the user can select, reject, or edit each of the proposed sentences.

Thanks for your email.

The demo to the client was liked and an [additional feature is requested] before [GA in January].

Below is an example of a display of proposed keywords and associated weightings presented to a user. As a result of this display interface, a user could select a proposed keyword by clicking on or near the proposed keyword. Alternatively, a user could type the keyword into part of a sentence from sentential template repository 210. In this case, the typed word would be stored in context repository 212 and would be associated with the context of the proposed keyword.

TABLE 1

| Keyword Type | Keyword | Score computed from frequency/recency |
| --- | --- | --- |
| Topic | Anchor feature | 0.80 |
| Event | Call a meeting | 0.45 |
| Event | Demo to client | 0.23 |
| Named Entity (Person) | Ralph | 0.10 |
| Named Entity (Date) | Before the GA date | 0.76 |

As illustrated in table 1, auto-draft builder 208 can propose a plurality of proposed keywords, with a corresponding weighting or weightage associated with each proposed keyword, indicating which response auto draft assistant system 112 deems most relevant.

Sentential template repository 210 comprises a database that stores sentence templates that are used by auto-draft builder 208 to prepare one or more proposed responses that are displayed on a user's device. Sentential templates can be designed to model user responses in messages—e.g., email text, written documents, or the like. The syntax/structure can be similar or uniform, wherein proposed keywords are presented or automatically inserted into a template using auto-draft builder 208. Sentential template repository 210 can include context information associated with each sentential template, such that different sentential templates can be leveraged as part of the auto-draft process, depending on the context(s) of the email thread. For example, different sentential templates may be presented when a context includes talking about a party vs. when a context relates to a work-related meeting. Further, sentential template repository 210 can be generic—that is, sentential template repository can be used to store sentential templates for a variety of email threads and/or other electronic communication responses and need not be associated with just one communication thread.

Context repository 212 can be configured to store keywords, proposed keywords, contexts, associated weightings, optionally a user confidence level, and optionally prior responses associated with the keywords and/or contexts. Information to be stored is received from content analyzer 206 and optionally, in some cases, from user input. In accordance with at least one embodiment of the disclosure, context repository 212 is configured to evolve based on the quality of a dataset. For example, the greater the instance or occurrence of keywords or contexts within an email thread as determined by context analyzer 206, the more likely the most relevant proposed keywords or contexts are leveraged in an auto-draft response.

As noted above, a new context repository 212 can be created for each new email or other communication thread and each context repository 212 can store information associated with the email thread. This allows the thread to be searched, such that a user can query a particular thread to determine the context(s) of the thread without necessarily reading all of the emails in the thread to determine the context(s) of the email thread. Auto draft assistant system 112 can generate (e.g., automatically) a search report and organize the terms (keywords, contexts, prior responses, and other information received from context analyzer 206) and present such information in a format that is, for example, chronological and itemized by context for each email or from an email thread. For example, the most recent emails in a long thread, might introduce a new term such as "RELEASE" and "THIS THURSDAY," whereas the older emails in the thread were highlighting "RELEASE" and "NEXT WEEK." The report could present the information with the most recent/most relevant context information first and/or highlight such information in the thread.

In accordance with some exemplary embodiments, query associations can be used to containerize the content (also generally referred to herein as terms or information) in context repository 212. For example, a how or whom for the topic or context "Feature demo" could be answered using repository identification repo-id 2. Similarly, a when could have a possible answer picked from repo-id 3. Further, a source of content (e.g., whether from the particular email thread, other email, text, chat, social media, or the like) can also be mapped.

TABLE 2

| Repo-id | Repository String | Keyword(s) | Data set reference | Query association |
|---|---|---|---|---|
| 1 | Feature demo | content-sharing demo customer | Repo-id 1, 2, 3 | What? |
| 2 | Demo to customer | "demo to HP" "feature liked" "additional feature requested" | Repo-id 2, 3 | How? Whom? |
| 3 | Demo to PLM | "feature accepted" "Anchor feature" "GA in January" | Repo-id 2, 3 | When? Whom? |

As noted above, in at least some cases, auto draft assistant system 112 (e.g., context analyzer 206) can identify whether a query for which a possible response already exists. This information can also be stored and containerized in context repository 212. For example, if more than one email thread exists, a determined context in one email thread can be used to determine (e.g., the same) context in another email thread and to facilitate a similar response in the second email thread and/or present the prior response to auto-draft builder 208. A query association can be connected to the types of queries generated from the context Repository 212. By way of example, a keyword "content-sharing demo" may be linked to a query "What."

Search engine 214 can be used to automatically search an email thread, email system components 202, and/or other system(s) components 204 for keywords, such as keywords determined using context analyzer 206. Additionally or alternatively, a user can use search engine 214 to search for keywords to determine a context of an email thread or a portion thereof. Search queries and search results can be stored in context repository 212, sentential template repository 210, and/or elsewhere and can be used to assist with determining context of other email threads and/or portions of an email thread.

Front end 216 can be used to interface email system components 202 and/or other system(s) components 204 to context analyzer 206 and/or search engine 214 to access information in such systems. Front end 216 can be used to facilitate allowing context analyzer 206 to determine a context of an email thread, allowing context analyzer 206 to automatically search such components, and/or allowing a user to independently search information on email system components 202 and/or other system(s) components 204. In accordance with exemplary aspects of the disclosure, front end 216 can be used to search for context (e.g., as determined by context analyzer 206) that is based on possible inclusion/exclusion of linguistic factors or factors regarding the email communications (e.g., social media, etc.) as described herein.

When an auto-drafting process begins—e.g., when an initial email is created by a user or is sent to or read by a recipient, front end 216 interacts with email system components 202 to inform a context analyzer 206 that a new email has been drafted or sent to a user device or to a server.

In accordance with further embodiments of the disclosure, an electronic communication method for providing a draft text response includes the steps of using a context analyzer (e.g., context analyzer 206) to determine one or more contexts within a communication thread on or received from a communication server (e.g., a server that forms part of email system components 202 and/or part of other system(s) components 204), storing context information (e.g., keywords and/or proposed keywords, prior responses, and the like) in a context repository (e.g., context repository 212), retrieving one or more sentential templates from a sentential template repository (e.g., sentential template repository 210), using an auto-draft builder (e.g., auto-draft builder 208) that receives context information from the context repository and the one or more templates to prepare text to be displayed on a user device (e.g., device 102, 104). The method can further include automatically creating a context repository (e.g., context repository 212 or a portion thereof) for each new communication thread. The context repository can be updated for each response in the communication thread. The step of displaying can include displaying a plurality of alternative responses, with an optional weighting factor associated with each proposed response. The weighting factor can be based on factors noted above and can assist a user in selecting a desired response. The method can also include displaying one or more proposed keywords and optionally associated weighting for one or more of the proposed keywords that can be used in proposed response(s), wherein the highest weighted keyword(s) can optionally initially form part of a proposed response. Methods can include displaying a predetermined number, e.g., 1, 3, 5, or the like of proposed responses/sentences and/or proposed keywords for each blank within a proposed response or sentence. Each of the displayed proposed keywords can be displayed to a user on the user's device, along with a weighting. Additionally or alternatively, a user can optionally input a user confidence level associated with a response. When a user selects a particular response, context analyzer 206 updates context repository 212 and/or sentential template repository 210, so that such information is available for future context analysis using context analyzer 206. For example, proposed keywords with a high (e.g., greater than 50% out of a possible 100%) user confidence level can be considered more relevant in the same context than proposed keywords with no or lower associated user confidence levels.

Methods can also include a context analyzer automatically searching a context database (e.g., context repository 212) and/or other resources, such as system components and servers described herein, for keywords. Moreover, methods can include a step of using query associations to containerize at least some of the context information, as described above.

Exemplary methods can also include a step of a user entering a response and the context analyzer verifying whether the response is on topic—i.e., whether the response is within the context(s) of the email thread. The method can further include displaying to a user an indicia of whether a user's proposed response is on topic—e.g., by using color, text formatting, or the like to indicate that a proposed response may be or is off topic or is on topic.

In accordance with yet additional embodiments of the disclosure, when a new email is received, an auto-draft builder (e.g., auto-draft builder 208) can prepare an automatic response that includes a general response based on a query type (i.e., context) as determined by context analyzer 206. For example, the sentential templates repository 210 can provide the auto-draft builder with statements that are general in nature—e.g., Hope you are doing well or Have a great day ahead. Auto draft assistant system 112 would update the context repository. In this case, because auto-draft builder interfaces with the email system components 202, auto-draft builder 208 will pass that feedback of the changes to sentential template repository 210, so that the statement can be stored in the sentential template repository.

Context analyzer 206 can then determine the relevant keywords and auto-draft builder 208 can use corresponding proposed keywords to automatically provide responses to a sender of the email, as described above.

In accordance with further exemplary embodiments of the disclosure, one or more proposed responses can be automatically prepared using the auto-draft builder, such that the one or more proposed responses are included in the email sent to a recipient. This may be used once a context repository has been formed for an email thread. In this case, the context analyzer causes a search engine (e.g., search engine 214) to search related query associations (e.g., a user types query: "Is the community meeting on Wednesday or Friday?"; Context-analyzer response, "80%—The meeting is on Wednesday" and "20%—The meeting is on Friday") that may be within email system components (e.g., email system components 202) and/or other system(s) components 204, determines a context, relays the context information to the context repository and then either the context repository, the context analyzer, or the auto-draft builder can relay the context information to the sentential template repository to query the sentential template repository for sentential templates corresponding to the context(s). A user can then decide whether to send the proposed response(e). Alternatively, the context repository (if sufficiently primed with a context) and the auto-draft builder can be set to autonomously issue responses within the context of an actual conversation. In the absence of user deciding whether to send a response, this autonomous drafting option could be set to perform like a conversation bot using context derived from, for example, passages of text or threaded conversations.

Figure 3:
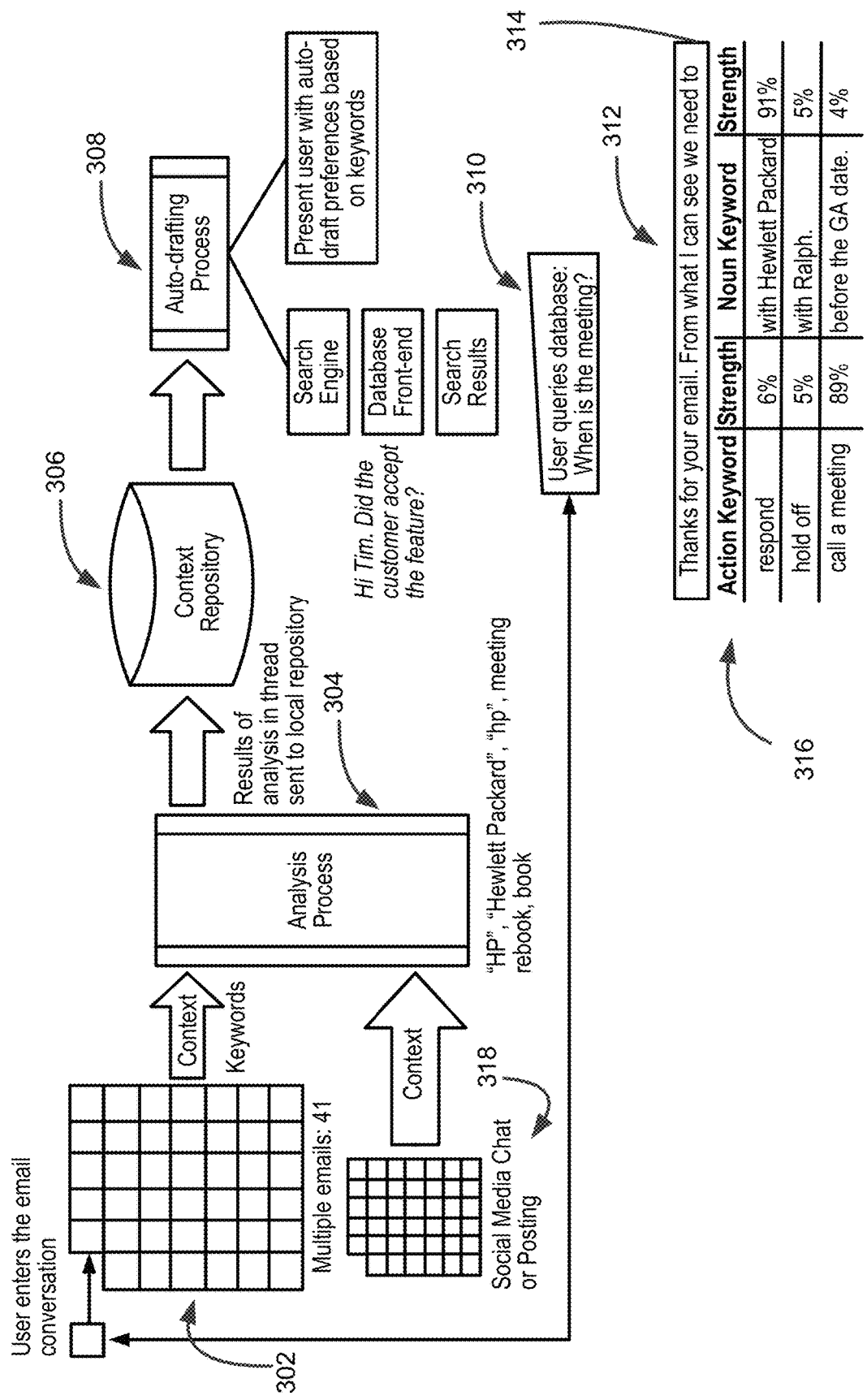
FIG. 3 illustrates a method of using an electronic communication system in accordance with exemplary embodiments of the disclosure.

FIG. 3 illustrates an example of an electronic communication method 300 using an auto draft assistant system, such as auto draft assistant system 112, in accordance with exemplary embodiments of the disclosure. In this case, the method begins with a user reviewing an email that is part of an email thread (step 302). In the illustrated example, the thread includes 41 individual emails.

Next, at step 304, a context analyzer reviews the emails in the thread and extracts keywords, which, as noted above, can include anything that can identify the context(s) of the email thread and/or emails within a thread. At this time, the context analyzer can also add a weighting associated with each of the keywords and/or proposed keywords associated with the keywords, wherein the weighting can be determined as described above. The context analyzer can also access other resources to determine context, keywords, proposed keywords, and/or weighting to be associated with various keywords (step 318). For example, with permission, if desired, the method can include reviewing one or more databases associated with a user's social media, chat, text, or similar systems to facilitate determining a context of the email thread or an email within the thread. The keywords, proposed keywords, and the associated weightings can be stored in a context repository (e.g., on a user device or elsewhere) at step 306.

At step 308, an auto-draft builder accesses a sentential database and the context repository to create one or more proposed (e.g., sentential) responses 312 based on the context(s) of the email thread. The one or more proposed responses 312 can include a sentential template 314 and a plurality of proposed keywords for one or more portions or blanks within the sentential template. The proposed keywords can be presented to a user on a user device, wherein a weighting (illustrated as "strength" in table 316) is presented with each proposed keyword that is caused to be displayed by the auto-draft builder. Additionally or alternatively, the auto drafter can include a weighting for each proposed response of a plurality of proposed sentential responses.

At step 310, a user can use an application or a client on a device to query a database, such as a database that stores the emails for a particular context and/or the context repository. This can be used for general information (e.g., to calendar an event), to facilitate drafting a new or responsive email that stays on topic, or the like.

Similar to the review process that begins when entering an established email string, when a new email is started, other system(s) components 204 can be used to pull keywords to establish a context of an email thread and to provide keywords that can be used in responses created by auto-draft builder 208.

FIGS. 4-14 illustrate exemplary methods and system components in greater detail. These examples are merely illustrative, and unless stated otherwise, are not meant to limit the scope of the invention disclosed herein.

Figure 4:
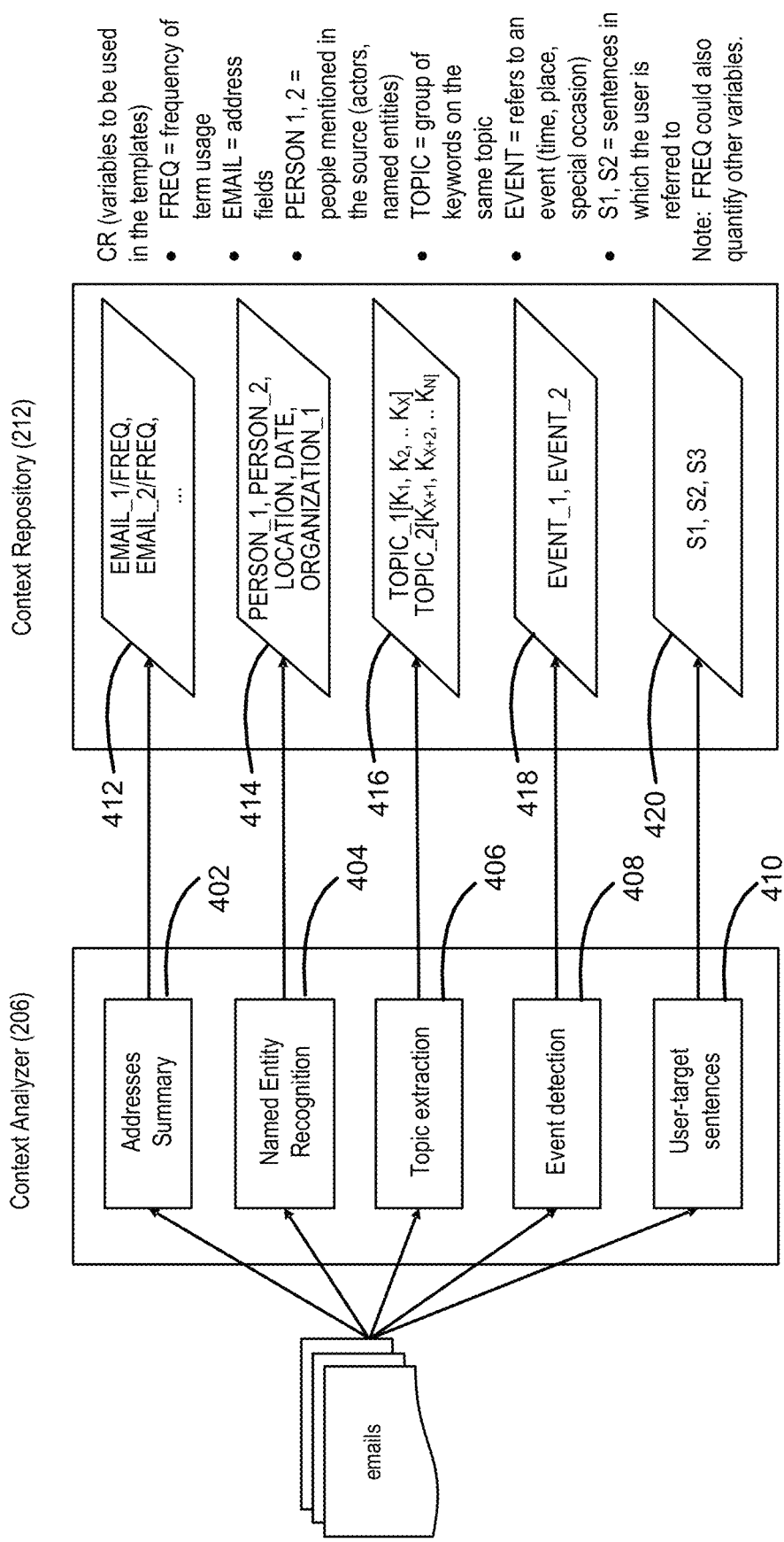
FIGS. 4 and 5 illustrate examples of a context analyzer and a context repository in accordance with at least one embodiment of the disclosure.
Figure 5:
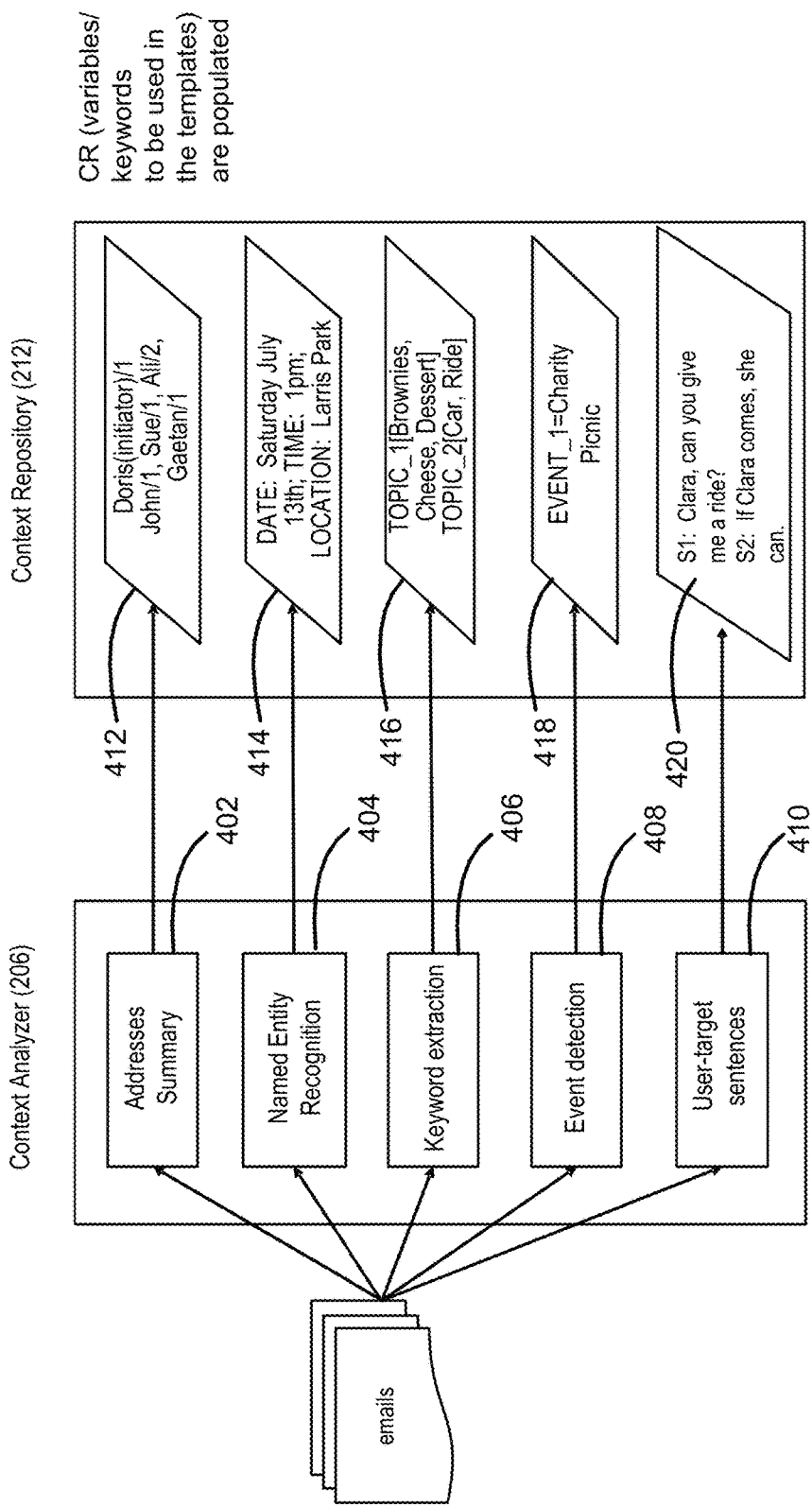

FIG. 6 illustrates a sample email or communication thread 600, and FIGS. 4 and 5 illustrate an exemplary contact analyzer 206 and context repository 212. As noted above, once an email (or other communication) is started or after a predetermined number or length of a communication is reached, context repository 212 is created.

In the illustrated example, context analyzer 206 can review email thread 600 for one or more of categories of keywords, such as addresses (e.g., email addresses, names, and the like) information 402, named entities information 404 (e.g., person, company, organization, or the like), topics 406, events 408, and/or user targeted sentences 410 and cause corresponding keywords (also referred to as variables) to be stored in context repository 212, along with weighting (e.g., frequency and the like) information. The keywords can be stored in or associated with the respective categories or contexts. The variables/keywords can be used as proposed keywords as described herein. Further, the keywords can be determined as described above, and/or by comparing the email or other communication thread to a list of previously categorized keywords, which may be stored elsewhere.

By way of illustration, context repository 212 can include address summary and corresponding frequency information 412, name entity and corresponding frequency information 414, topics and corresponding frequency information 416, events and corresponding frequency information 418, and/or user-target sentences and any corresponding frequency information 420.

With reference to FIGS. 5 and 7, the address information in email thread 600 includes information extracted from email addresses (702, 704) and email signature information (706-710) at the end of a particular email message. Such information can be stored on context repository 212 and associated with address and frequency information 412.

FIGS. 5 and 8 illustrate named entity identification, extraction, and storage in context repository 212. In the illustrated example, context analyzer 206 recognizes times (802), dates (804), and locations (806-810), and stores or causes to be stored the corresponding information in context repository 212.

FIGS. 5 and 9 illustrate determination and storage of topics 902 (food) and 904 (travel) referred to in communication thread 600. Similarly, FIGS. 5 and 10 illustrate event (1002) detection and storage in context repository 212. And, FIGS. 5 and 11 illustrate identification and storage of user-target sentences 1102, 1104 for a particular user. Each user in a communication thread can have associated user sentences.

As noted above, Stanford Core NLP can be used for some keyword extraction. For example, Stanford Core NLP could be used to perform named entity recognition 141 in FIG. 4. Addresses summary information can be collected by determining each address and simple count of the number of times each person involved in the conversation is replying. Topic information 416 can be determined using, for example, open source software, such as code available at http://keywordextraction.net/ or http://www.cortical.io/extract-keywords.html. Event information 418 can be extracted using, for example, regular expressions (patterns) combining dates and locations. User-target sentences information 420 can include a count of the number of sentences containing the user's name.

Figure 12:
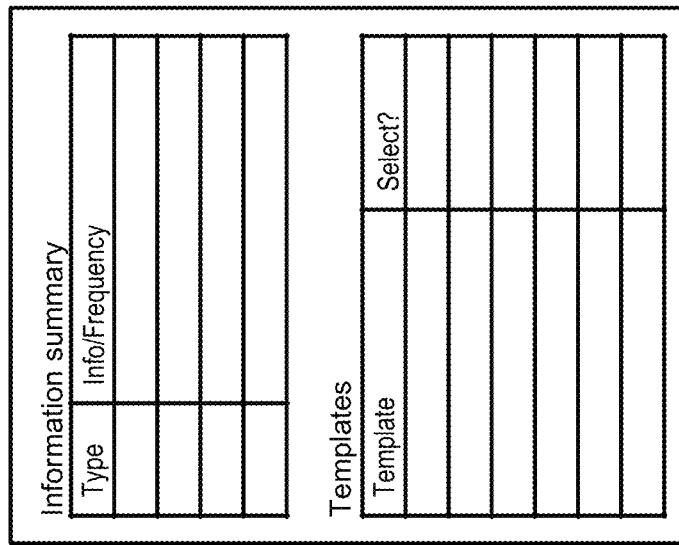
FIG. 12 illustrates an exemplary report in accordance with examples of the disclosure.

Turning now to FIG. 12, an exemplary summary of information retrieved from email thread 600 is illustrated in report 1202. This information can be sent to auto-draft builder 208 to facilitate formation of proposed responses.

FIGS. 13 and 14 illustrate an exemplary sentential template repository 210 in accordance with examples of the disclosure. Sentential template repository 210 can include templates 1302-1316 that can be presented to a user as described herein.

As illustrated in FIG. 14, auto-draft builder 208 can use information in sentential template repository and information to present proposed sentences 1402-1410, with corresponding probability or weighting information 1412-1420, and optionally corresponding option buttons 1422-1430 to select a desired response. Alternatively, a user may click on a proposed sentence, edit a proposed sentence, or create a new sentence, which may then be added to sentential template repository 210.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

We claim:

1. An electronic communication system comprising:
   a communication server;
   a context analyzer to determine a context within a communication thread on or received from the communication server;
   a sentential template repository comprising a plurality of sentential templates; and
   an auto-draft builder that receives context information associated with the context from a context repository and one or more sentential templates from the sentential template repository and prepares one or more responses, to an electronic communication in the communication thread, comprising the one or more sentential templates to be displayed on a user device, wherein the one or more responses to be displayed are generated based on modifying the one or more sentential templates using at least a portion of the context information, and
   wherein the context analyzer determines keywords in the communication thread and modifies each of the one or more sentential templates to include one or more of the keywords.

2. The electronic communication system of claim 1, wherein the context analyzer causes corresponding context information to be stored in a context repository.

3. The electronic communication system of claim 2, wherein the context repository stores one or more responses from a user associated with one or more contexts of the communication thread and further wherein the communication system automatically issues a response to the electronic communication on behalf of the user of the user device comprising a system-selected one of the one or more responses.

4. The electronic communication system of claim 1, wherein the keywords are used to verify a context associated with the one or more of the responses or with a user response prepared by a user operating the user device matches the context within the communication thread.

5. The electronic communication system of claim 1, wherein each of the one or more responses to be displayed further comprises indicia of strength of each of the one or more keywords included in the one or more responses.

6. The electronic communication system of claim 5, wherein the strength is based, at least in part, on one or more of a number of times keywords corresponding to the one or more keywords appear in the communication thread and a sent time associated with the one or more keywords.

7. The electronic communication system of claim 1, further comprising one or more other communication systems components, wherein the one or more other communication systems components provide additional context information to the context analyzer and the additional context information is used to determine the context.

8. The electronic communication system of claim 7, wherein the one or more other communication systems are selected from the group consisting of email systems, text systems, chat systems, and social media systems.

9. The electronic communication system of claim 1, wherein the communication system determines whether a response to a similar query as one identified in the electronic communication exists in one or more of the context repository and the sentential template repository, and if the response to the similar query exists, causes the response to the similar query to be displayed within, or as an alternative to, the one or more responses prepared by the auto-draft builder and concurrently displayed on the user device.

10. An electronic communication method for providing a draft response, the electronic communication method comprising the steps of:
    using a context analyzer to determine a context within a communication thread on or received from a communication server;
    storing context information comprising keywords in a context repository;
    retrieving one or more sentential templates from a sentential template repository;
    using an auto-draft builder that receives context information from the context repository and the one or more templates to prepare two or more proposed responses to be displayed on a user device using the context information and the one or more templates; and displaying the one or more proposed responses on the user device.

11. The electronic communication method of claim 10, further comprising automatically creating a context repository for each new communication thread.

12. The electronic communication method of claim 11, wherein the context repository is updated for each response in the communication thread.

13. The electronic communication method of claim 10, further comprising a step of a user entering a response to an electronic communication in the communication thread and the context analyzer verifying whether the response is in the context of the communication thread.

14. The electronic communication method of claim 10, wherein the one or more sentential templates are selected or generated based on the context.

15. The electronic communication method of claim 10, wherein the step of displaying comprises displaying a plurality of alternative responses for selection or editing by an operator of the user device.

16. The electronic communication method of claim 10, wherein the communication method further comprises a step of a user inputting a user confidence level associated with one of the two or more proposed responses and updating the context repository associated with the communication thread to include the user confidence level, whereby the context repository is modified in response to changes to the communication thread.

17. The electronic communication method of claim 10, further comprising a step of automatically searching a context database for keywords and wherein the using of the auto-draft builder includes preparing each of the two or more responses to include one or more of the keywords.

18. The electronic communication method of claim 10, further comprising a step of using query associations to containerize at least some of the context information.

19. The electronic communication method of claim 10, wherein the method is used as part of a chat session.

20. An email drafting assistant system comprising:
an email server;
a context analyzer to determine a context within a communication thread on or received from the email server;
a sentential template repository comprising a plurality of sentential templates; and
an auto-draft builder that receives context information associated with the context from a context repository and one or more of the plurality of sentential templates and prepares one or more proposed responses to be displayed on a user device,
wherein the context information includes one or more keywords, and
wherein each of the one or more proposed responses to be displayed includes at least one of the one or more keywords,
wherein an indicia of strength is displayed for each of the one or more keywords in the one or more proposed responses displayed on the user device, and
wherein the strength is determined based, at least in part, on one or more of a number of times keywords corresponding to the one or more keywords appear in the communication thread and a sent time in the communication thread associated with the one or more keywords.

* * * * *